(12) United States Patent
Jones

(10) Patent No.: US 6,332,040 B1
(45) Date of Patent: Dec. 18, 2001

(54) METHOD AND APPARATUS FOR SORTING AND COMPARING LINEAR CONFIGURATIONS

(76) Inventor: J. Howard Jones, 858 Joe Yenni Blvd. - Apt 29, Kenner, LA (US) 70065

( * ) Notice: Subject to any disclaimer, the term of this patent is extended or adjusted under 35 U.S.C. 154(b) by 0 days.

(21) Appl. No.: 08/964,298

(22) Filed: Nov. 4, 1997

(51) Int. Cl.[7] .............................. G06K 9/48; G06K 9/00; G06K 9/46
(52) U.S. Cl. .......................... 382/197; 382/187; 382/203
(58) Field of Search ..................... 382/119, 123, 382/185, 186, 187, 189, 193, 197, 203, 305

(56) References Cited

U.S. PATENT DOCUMENTS

| | | | |
|---|---|---|---|
| 4,468,808 | * | 8/1984 | Mori et al. ............................ 382/185 |
| 4,829,583 | * | 5/1989 | Monroe et al. ....................... 382/185 |
| 5,010,500 | * | 4/1991 | Makkuni et al. ..................... 382/186 |
| 5,343,537 | * | 8/1994 | Bellegarda et al. .................. 382/187 |
| 5,751,852 | * | 5/1998 | Marimont et al. .................... 382/180 |
| 5,812,698 | * | 9/1998 | Platt et al. ............................ 382/186 |
| 5,883,986 | * | 3/1999 | Kopec et al. ......................... 382/310 |

* cited by examiner

*Primary Examiner*—Amelia Au
*Assistant Examiner*—Mehrdad Dastouri

(74) *Attorney, Agent, or Firm*—C. Emmett Pugh; Pugh/Associates, Patent & Trademark Attorneys (57) ABSTRACT

A computing device to classify, manipulate, store, search, and selectively retrieve items from image databases, using a method & apparatus including a computer processor to analyze the configured disposition of a multiplicity of linear motion paths that constitute a glyph delineated within a defined planar rendering area and to process, manipulate, and compare data representing said configured disposition of said linear motion paths, comprising (a) a template analytic lattice constituted of a predetermined multiplicity of cell partitions, the totality of the analytic lattice being coextensive with the defined rendering area of the glyph and in the plane of motion of the linear motion paths of the glyph; (b) means of interpreting each linear motion path as a sequence of displacement vectors, determining which displacement vectors intersect specific boundaries of specific cells of the analytic lattice, and registering each cell boundary intersection by both recording the intersecting vector inclination gradient and incrementing an associated vector count for each cell bounded by the intersected boundary; (c) means of combining all of the vector inclination gradients registered for each cell, thereby producing an associated numeric clutch value as a cumulative total of the registered vector inclination gradients, and (d) means of deriving a numeric inclination index value for each cell from the associated vector count and the associated clutch value, the kind of inclination index being selected from a group defined herein.

14 Claims, 6 Drawing Sheets

Fig. 1A　　　　　　　　　　Fig. 1B

*Cartesian (0,0) :(-6, -2) = SPOT Vector T = 124;*

*SPOT value S = squareRoot(T) = 11.1355;*

METHOD AND APPARATUS FOR SORTING AND COMPARING LINEAR CONFIGURATIONS

TECHNICAL FIELD

This invention relates to the use of computing devices and systems to classify, manipulate, store, search, and retrieve items of image databases.

BACKGROUND ART

People make all kinds of informal drawings as pictorial notations, from quickly encircling objects of interest to sketching details in scenes, designs, and concept proposals. Descriptive drawings of events and situations may be choreographed as complexes of linear motion paths. Patterns of animal migration or movements of hurricanes are shown and compared through clusters of such lines of movement.

Computing devices increasingly are used to track motions, whether in pen based graphic devices responding to stylus movements or in process monitoring equipment where motion data may be calculated from a complex field of events. Such linear motion analyzers can range from relatively simple hand-held Personal Digital Assistants (PDAs) to large and complex arrays of motion detectors, cameras, and other specialized equipment communicating across computer-mediated networks.

As used herein, glyph means a line drawing or other linear configuration that communicates specific relationships or details as structural factors of the motion paths constituting the configuration itself. It is important to distinguish between the schematic configuration of motion paths and the rendered image of a glyph. Even in simple line drawings the marks laid down by a pen or other implement may vary widely. For instance the characteristic imprint of a given type of implement may result in lines that are extremely broad or very narrow. Or the implement may respond to varying pressure, as with a lettering brush or angled calligraphy pen. Or the moving implement may be bounced along its path to draw dots and dashes instead of a solid line. All of these and other variations may be emulated in a computer graphic input system such that variations in the marks rendering various configurations may confuse and obscure similarities in their underlying pattern of motion paths. During comparison of drawn configurations such incidental mark variations can obscure strong similarities of line path disposition and consequently hinder interpretive methods that are dependent solely upon analysis of sets of local mark features.

Because they are so widely evident in human enterprise, glyphs have great potential for user interfaces in such computer-mediated tasks as pictorially searching image databases and guiding computer controlled processes by means of glyph-structured gestures.

To exploit glyphs in a computing environment requires a method of sorting, comparing, and grouping them in terms of their qualitative features. Evaluating structural similarities among a varied collection of glyphs is fundamental to using them as representative tokens of external entities, as data keys for accomplishing pictorial searches of image databases, or as elements of interface control. Comparison of glyph structures is a necessary part of extracting useful pictorial information from their configurations.

Many different techniques have been devised to use glyphs as part of graphic user interfaces of computer systems to enable direct input of pictorial information and to graphically designate search keys for retrieving items from image databases. To the extent that these and other applications rely upon matching local representational features of visual media with specific conceptual content they may be treated as content-centered search keys, whether in textual, pictorial or other media context.

In the earliest databases image features were described by text synopses so that data operations could be directed in terms of keywords and phrases found in the reference text. Such high-level conceptual content keying introduces ambiguities throughout creation, maintenance, and use of textually keyed databases since there is a need to analyze and interpret pictorial content in terms of a common repertoire adequate to the domain of intended use. For example, an architect probably uses quite different keywords for a database of buildings and structures in a city than those relevant to a military tactician or a social historian. As computing systems gained graphic user interfaces, icons that could be activated by a pointing device such as a mouse, stylus, or trackball displaced keyboard commands. But the fundamental dependence upon retrieval by content features has persisted even into pervasively graphic control systems. Whether searching for key words or for key assemblies of local pictorial elements the same problem persists: where the size of the database is large and each item is a complex structure, the processing cost of exhaustively comparing every member with a key is prohibitive. Some means is needed of low-level structural filtering to quickly eliminate unqualified pretenders and to extract a collection of highly likely match candidates that subsequently can be processed in terms of high-level content based parameters.

Existing drawn figure and handwriting recognition devices typically use a template repertoire of local mark features against which to compare and match manually drawn gestural strokes. For each cluster of input lines interpretive software attempts to determine the presence or absence of known features such as lines extending below a baseline; proximity and connection of angles, curves, straight line segments; and closed loops with protruding line extensions. Each input configuration is tested against such template features to arrive at match candidates. Further processing of contextual information may be made to disambiguate matching probabilities, to interpret, and finally to display the recognized characters or word. Graphic interfaces sometimes isolate and compare geometric features of simple shapes to decipher and characterize circles, ellipses, squares, rectangles, triangles, and even free-form shapes drawn by hand.

Current approaches to interpreting linear gestures generally depend upon one or more of the following approaches to processing local mark feature sets:

- derivation of correlation factors from scalar multiplication of vectors representing stroke path segments that are then compared with stored scalar products of template configurations;
- isolation of geographical features such as lagoons (closed areas) and bays (open areas) along with directional mark features such as loops, arcs or straight segments found among clustered line strokes that are compared with stored template features;
- circumnavigation of the peripheries of a cluster, comparing parameters of height, width, perimeter, area, and waveform with those of stored templates;
- manipulation, normalization, and comparison of pen strokes with stored template gesture prototypes; and
- classification of shapes by first discerning features such as blockiness, symmetry, convexity, and count of edgebreakthroughs and then calculating by linear transform a parameterized shape class value.

Whether a computer interface is based on entering text by keyboard, pointing and clicking icons with a mouse, or marking a touch sensitive surface with a stylus, there are a number of disadvantages inherent in any comparative control system based upon a template repertoire of local mark features:

Effectiveness of discrimination and matching among candidates is an inverse function of the ambiguity of feature set articulation. The efficiency of any method based on feature matching decreases as the reference repertoire increases in size and variability of its members.

Characterizations of non-textual configurations depend upon formal definitions of geometric features and are difficult to categorize and rank if they vary much from simple geometric figures.

Storing, searching, comparing, and retrieving items of large glyph databases are typically slow and computationally expensive.

Current feature matching methods are not easily extensible to new feature sets, thereby discouraging use of glyph structure sets to provide user customized computing device interfaces.

A list of prior patents currently known to applicant in connection with this matter, at least some of which may be of interest, is provided below:

| Patent No. | Inventor | Issue Date |
| --- | --- | --- |
| 4,773,098 | Scott | 09/20/1988 |
| 4,987,603 | Ohnishi, et. al. | 01/22/1991 |
| 5,119,445 | Suzuki, et. al. | 06/02/1992 |
| 5,164,996 | Pastor | 11/17/1992 |
| 5,184,732 | Ditchburn, | 02/09/1993 |
| 5,239,592 | Kameyama, et. al. | 08/24/1993 |
| 5,252,951 | Tannenbaum, et. al. | 10/12/1993 |
| 5,297,216 | Sklarew | 03/22/1994 |
| 5,333,209 | Sinden, et. al. | 07/2611994 |
| 5,365,598 | Sklarew | 11/15/1994 |
| 5,481,278 | Shigematsu, et. al. | 01/02/1996 |
| 5,537,484 | Kobayashi | 07/16/1996 |
| 5,550,933 | Stetten | 08/27/1996 |
| 5,583,543 | Takahashi, et. al. deceased, et. al. | 12/10/1996 |
| 5,592,608 | Weber, et. al. | 01/07/1997 |
| 5,594,810 | Gourdol | 01/14/1997 |
| 5,612,719 | Beernink, et. al. | 03/18/1997 |
| 5,613,014 | Eshera, et. al. | 03/18/1997 |

With respect to the "SPOT System" referred to herein, applicant authored an article on this approach entitled "The SPOT System: A Method of Numerically Specifying Spatial Configurations" published in ACM/SIGGRAPH *Computer Graphics* of April, 1981.

GENERAL SUMMARY DISCUSSION OF INVENTION

To avoid or at least diminish these prior art problems, the preferred embodiment of the present invention, using a method and apparatus using a computer processor to analyze the configured disposition of a multiplicity of linear motion paths that constitute a glyph delineated within a defined planar rendering area and to process, manipulate, and compare data representing the configured disposition of the linear motion paths, comprises:

(a) a template analytic lattice constituted of a predetermined multiplicity of cell partitions, the totality of the analytic lattice being coextensive with the defined rendering area of the glyph and in the plane of motion of the linear motion paths of the glyph;

(b) means of interpreting each linear motion path as a sequence of displacement vectors, determining which displacement vectors intersect specific boundaries of specific cells of the analytic lattice, and registering each cell boundary intersection by both recording the intersecting vector inclination gradient and incrementing an associated vector count for each cell bounded by the intersected boundary;

(c) means of combining all of the vector inclination gradients registered for each the cell thereby to produce an associated numeric clutch value as a cumulative total of the registered vector inclination gradients; and (d) means of deriving a numeric inclination index value for each cell from the associated vector count and the associated clutch value, the kind of the inclination index being selected from a group comprising (1) a numeric sum inclination index calculated as the specific rotational increment of a resultant vector inclination derived by adding the inclinations of all the vector displacements that intersect the cell boundaries, (2) a numeric meld inclination index calculated as the specific rotational increment of an average vector inclination derived by dividing the cell clutch value by the associated vector count; and (3) a numeric delta inclination index calculated as the specific rotational increment of a differential vector inclination derived by subtracting the meld inclination index value from the sum inclination index value;

whereby the configured disposition of linear motion path configurations may be conveniently compared and manipulated without needing to process representational content elements and incidental local mark features and whereby image databases may be more efficiently searched by filtering and eliminating non-viable search candidates prior to processor intensive content feature analysis through convenient comparison of textual token keys.

Accordingly, several objects and advantages of the present invention, based in compiling a periodic rotational increment from the concurrent orientations of tangents to path line segments at the periphery of each of a multiplicity of partitions within the defined rendering area of a configuration of linear motion paths constituting a glyph, include:

to provide a widely applicable and indefinitely extensible method of analyzing, comparing, sorting, and classifying glyphs in terms of periodic structural characteristics of their respective motion path configurations;

to provide a simple and coherent system of nomenclature for representing periodic structural relationships among items of a glyph data set and for comparing such periodic structural relationships within a variably definable range of match criteria;

to provide a straightforward means by which computing devices may manipulate and communicate comparative data regarding glyph linear configurations using conventional alphanumeric operations;

to provide a means by which the interface of a computing, game, entertainment, or other device may be variously customized by its user and be thereby controlled in accordance with unique configurations of linear movement effected by the user; and to provide a means of variably eliciting computer interface control elements by explicitly associating them, within variable and graduated ranges of criteria, with periodic values derived from either manual or automated tracings of the disposition of constituents of an image or other patterned deployment within some defined area of a plane.

Further objects and advantages are to provide a means of pictorially designating glyph data search keys, of associating a given glyph data key with one or more external objects for which the glyph may serve as a token, of easily sorting and comparing glyph keys using conventional alphanumeric operations, and of referencing associated entities (such as photographs, schematics, and various kinds of data sets) by means of image features of their glyph tokens. Still further objects and advantages will become apparent from a consideration of the ensuing description and drawings.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers, and, more particularly, closely related figures have the same number but different alphabetic suffixes, and wherein.

EXEMPLARY MODES FOR CARRYING OUT THE INVENTION

Figures 1A, 1B:
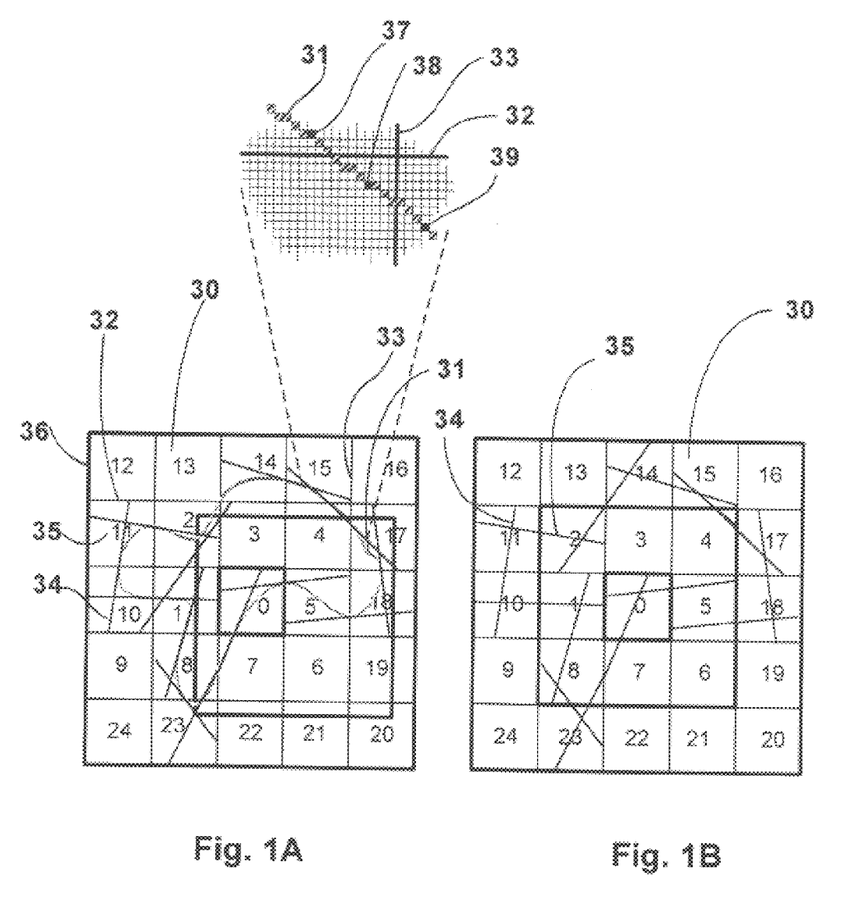
FIGS. 1A and 1B show the layout of a glyph rendering area subdivided into a lattice of cell partitions for analyzing glyph line motion paths in terms of vector intersection of cell boundaries.

A typical embodiment of the method of Lattice Articulated Vector Analysis (LAVA) is shown in FIGS. 1A and 1B. FIG. 1A depicts a template analytic lattice defined within a row and column matrix of pixels wherein a motion path of a glyph is given in successive station points (such as 37, 38, and 39). Successive station points comprise vector displacements that define successive segments of the motion path. A glyph comprises a multiplicity of such motion paths in specific disposition within a defined area of its rendering plane. Some motion paths may be totally contained in the defined rendering area and not cross its outer perimeter. Some motion paths may exit and re-enter the defined rendering area. Some motion paths may exit and not re-enter, or enter but not exit the defined rendering area of the glyph configuration.

A glyph may contain within its defined rendering area any number of zones of varying densities of motion paths that cross LAVA lattice boundaries at diverse and varying angles of inclination. The LAVA method exploits the periodic character of vector gradient samples taken at intervals across the lattice area to establish an ordered set of values that together express the concurrent disposition of motion paths engendering a glyph.

A vector displacement originates at its trailpoint and terminates at its leadpoint. Where a vector displacement crosses one or more boundaries between lattice cells, the cell of its origin is designated the trail cell (since it contains the trailpoint) and the cell containing the leadpoint is the lead cell. Where a vector displacement enters or exits across the lattice area perimeter 36, only one cell holds a station point.

In a computing system the motion paths of a glyph configuration can be described as a sequence of vector displacements defined by a tallied list of Cartesian coordinates. The start of a new motion path can be signaled in the coordinate list by a unique set of dummy values. For instance, the Cartesian set (0,0,0,0) denotes a zero length vector that originates and terminates at the Cartesian origin. This unique set of values is a null displacement and hence can be used to signal the start of a new motion path.

For each cell of the lattice two numeric values are produced by LAVA processing of a glyph vector coordinate list:

clutch, a cumulative total of all gradients registered in the cell and construed as a periodic rotational increment with respect to some predetermined polar origin, and vector count, an enumeration of registrations in the cell.

Figure 3:
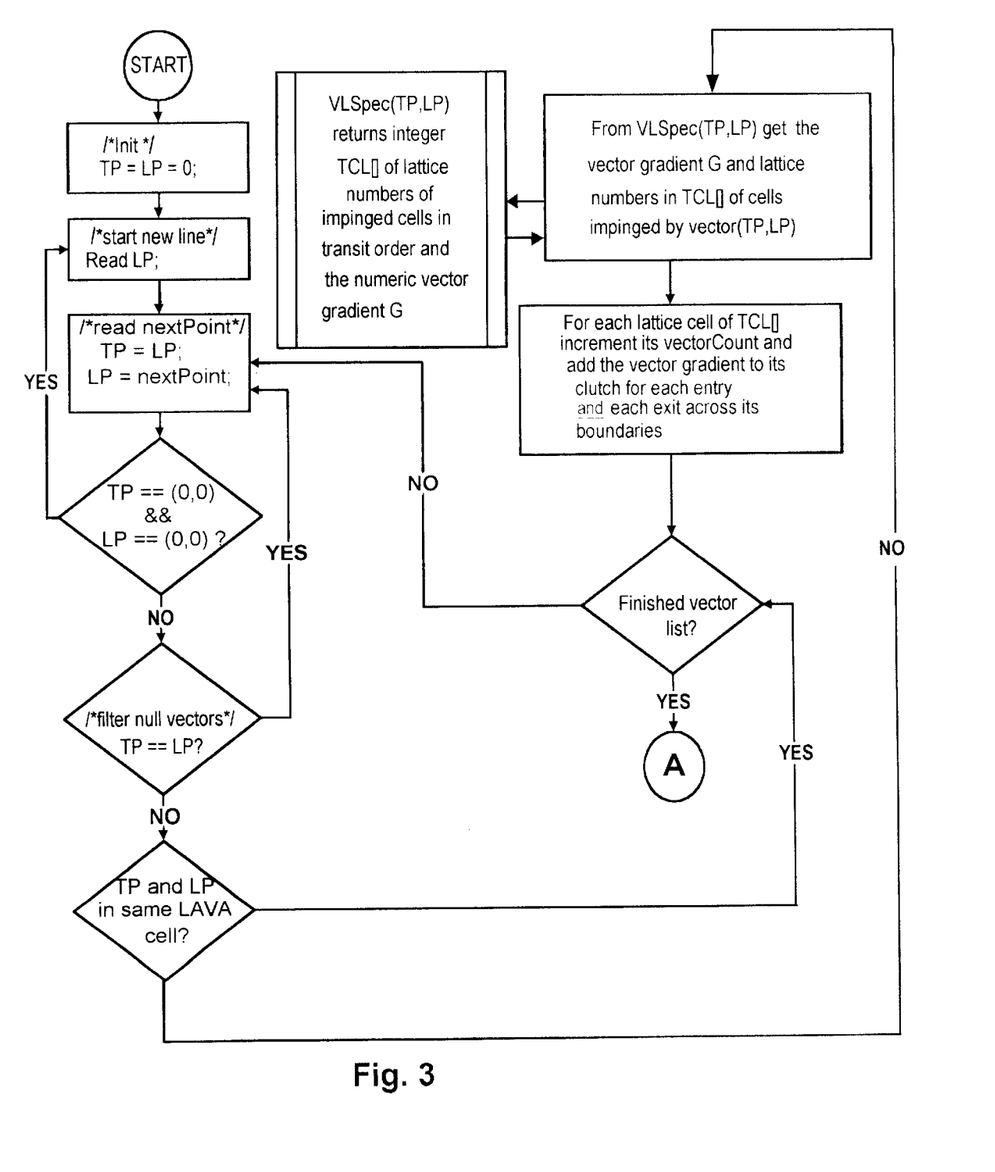
FIG. 3 shows a flow chart of the method of Lattice Articulated Vector Analysis (LAVA) of a configuration of linear motion paths constituting a glyph.

A computer system implementing the LAVA method, described in the flow chart of FIG. 3, reads a list of vector displacement coordinates and examines each successive pair for vectors whose trailpoints and leadpoints are not in the same lattice cell. Such a vector displacement may transit one or more lattice cell boundaries. It is analyzed by a software routine that both generates a list of cells whose boundaries are crossed by the vector and derives a numeric value to express its gradient, or inclination, with respect to the LAVA lattice. As detailed below, each vector that crosses one or more cell boundaries is registered in each of the cells it impinges by incrementing the cell vector count and adding the vector gradient to the cell clutch value.

Figure 2:
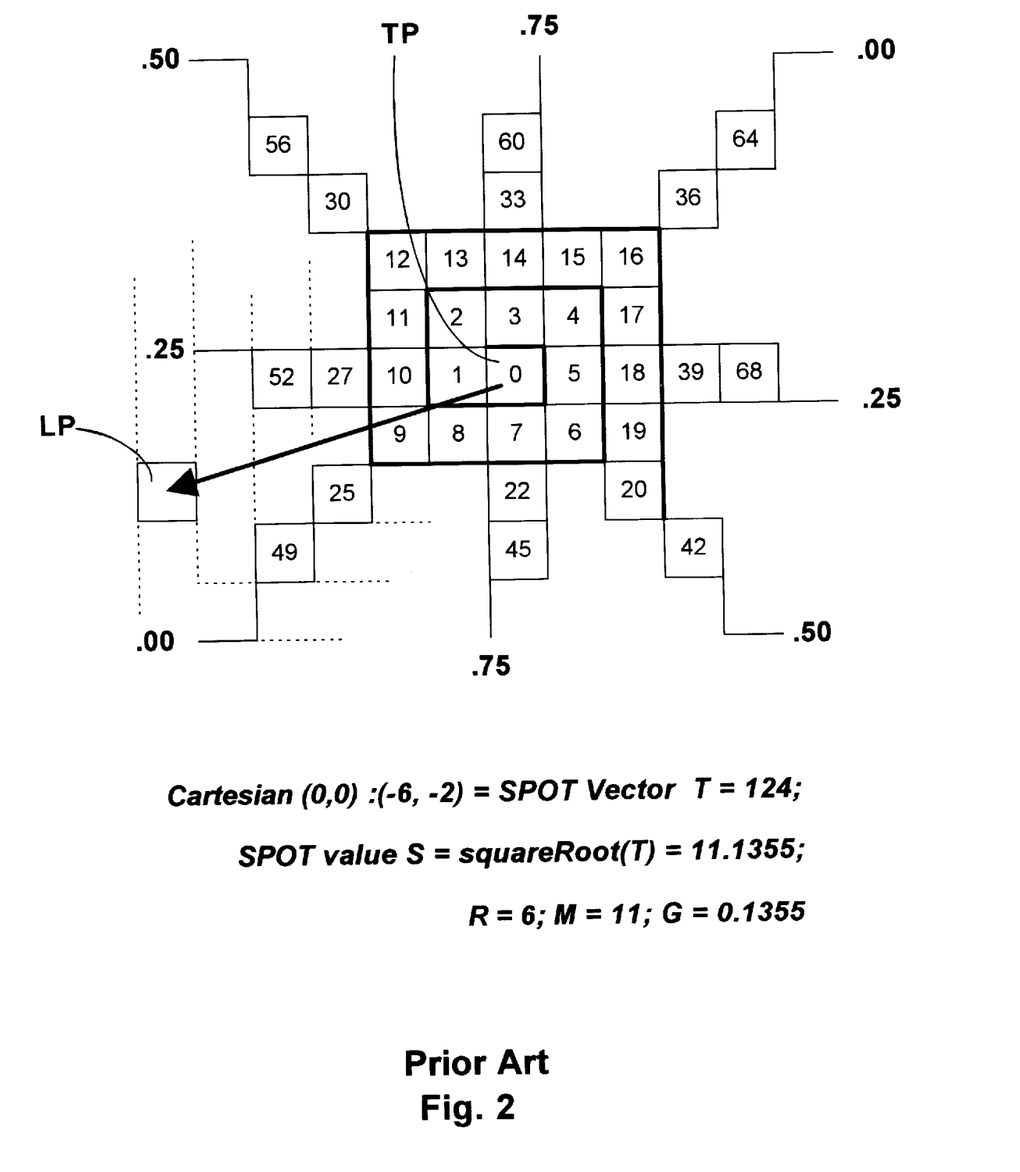
FIG. 2 shows a diagram of prior art, the "SPOT System," used in an embodiment of the invention described herein to calculate and denote gradients of vector displacements defined by station points on glyph line motion paths.

There are various ways to express a vector gradient as a numeric. FIG. 2 shows the SPOT System (for Spiral Position and Orientation Translator), a prior art method that is especially convenient for expressing properties of vector displacement within a digital matrix. SPOT notation is derived from regularities observed in the numeric field generated by a spiral pathway about a reference element in a row and column matrix of elements. From the reference element O, each element along the pathway is designated by an integer tallynumber T. Each complete circuit constitutes a range, R. R(0)=0; R(1)=1 . . . 8; R(2)=9 . . . 24; etc. Note that the even square integers are aligned along a diagonal up and to the right of the center. Similarly, the odd square integers are aligned along a diagonal down and to the left. The stepped boundary between the odd and even squares is the SPOT major diagonal, M.00, which serves as the polar origin of cell clutch values in this embodiment of the invention. A SPOT value, S, is the square root (tallyroot) of T. S is a real number comprising an integer portion, M, and a fractional portion, G. Moving along the spiral pathway, the fractional portion of S approaches a limit at each of the axes and diagonals intersecting at the center, namely M.00, M.25, M.50, M.75, and back again to M.00.

S expresses the length and orientation of a line vector on a digital bitmap in its integer portion, M, which denotes both the up-left/down-right orientation of the vector and its distance from the reference pixel. If the vector points to the left of the major diagonal, then M=2R−1 is odd. If to the right of the major diagonal, M=2R is even. The fractional portion, G, expresses the vector gradient (angle of inclination) in relation to axes and diagonals at M.00, M.25, M.50, and M.75.

In the example vector displacement depicted in FIG. 2 the tallynumber of (TP, LP) is T=124, at range R=6. Its SPOT value S=SquareRoot(124)=11.1355 . . . . Its magnitude M=11; its gradient G=0.1355 . . . .

For a given vector displacement, the gradient G as expressed in SPOT notation is a floating-point fraction 0.0<=G<1.0. The SPOT gradient numeric is the same for either directional case (TP to LP) or (LP to TP). Since a given glyph motion path may be traced in either of two directions, left to right or right to left, boundary intersection vectors are registered in both cells neighboring across the transited boundary to cancel out effects of handedness. Registration of a vector in a cell is accomplished by incrementing the cell vector count and adding the vector inclination gradient to the cell clutch value. In FIGS. 1A and 1B this policy of dual registration is signified by gradient lines called tangs drawn across the extent of each pair of impinged cells from their common boundary transit point, as at 34 and 35. But if a motion path displacement vector exits or enters across the lattice area outer perimeter then only a single cell tallies and registers the vector gradient at the perimeter intersection since one of the vector station points is outside the defined rendering area.

If a displacement vector crosses more than a single boundary (for example, from 37 to 39), it is decomposed into constituent sub-vectors, each of which crosses a single boundary (such as 37 to 38 and 38 to 39). Each such sub-vector is registered in both cells neighboring across the boundary it intersects (again, except where the lattice area outer perimeter is crossed, in which case the sub-vector is registered only in the cell containing its station point).

Figure 4:
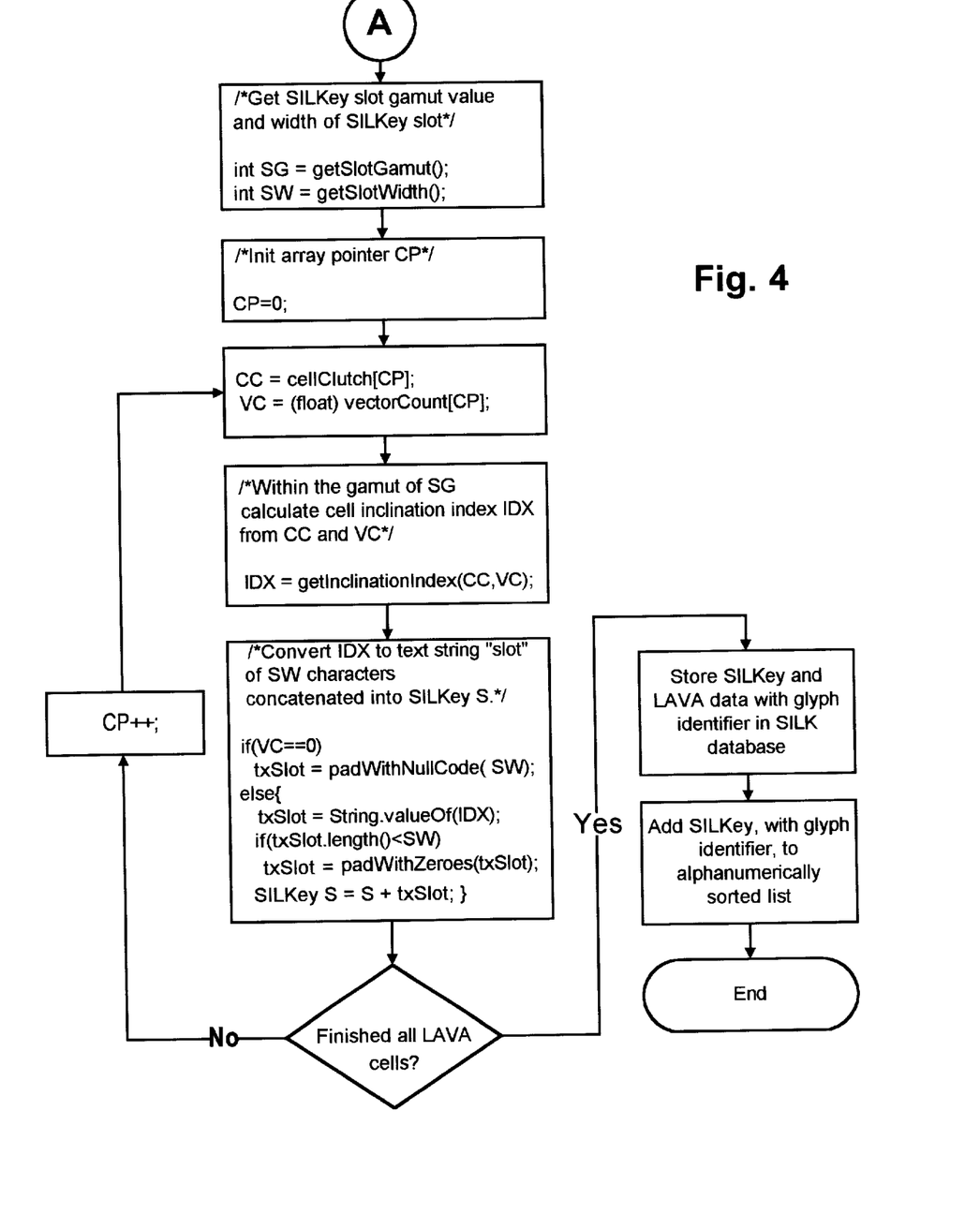
FIG. 4 shows a flow chart of the method for producing String Indexed Lattice Keys (SILKeys) from LAVA data.

FIG. 4 shows a flow chart of the method of deriving alphanumeric String Indexed Lattice Keys (SILKeys) from LAVA cell registry clutch and vector count values. A SILKey comprises an alphanumeric text string concatenated of substring slots. The string position of a slot corresponds to a predetermined ordering of LAVA cells. Each slot comprises a predetermined number of text characters (its width) and denotes the value of some kind of inclination index derived from the clutch and vector count of the corresponding LAVA cell.

After analysis of all vectors in the glyph motion path list is completed one or more kinds of inclination index may be derived from each cell clutch value and vector count. In each case the inclination index is an integer value within a defined gamut of integer values called the slot gamut, SG. For each type of inclination index the clutch value is manipulated to produce a positive fraction, 0.0<=R<1.0, representing some specific rotational increment with respect to the predetermined polar origin. Each type of inclination index, IDX, is an integer numeric produced by multiplying R by the slot gamut SG. In the examples below, based on the hexadecimal number system, SG=0×100, (256 decimal). In these examples an inclination index may range from 0×00 to 0×ff (0 to 255 decimal). Depending upon the intended application, any or all of the basic kinds of inclination index may be calculated, as well as additional kinds devised for specific uses.

The basic kinds of inclination index are
 (a) sum: for each cell the clutch is truncated of any integer portion that may have arisen in successively adding SPOT gradient fractions. The remaining fraction is multiplied by the slot gamut to derive the resultant index slot value for the cell. This kind of inclination index can be likened to the inclination of a dial pointer that has been successively tweaked by each vector inclination registered in the cell. All sum index slot values are held in an array for later processing.
 (b) meld: dividing the clutch by the number of displacement vectors registered in each cell produces an average of all vector gradients in the range 0.0<=G<1.0. It is multiplied by the slot gamut to derive the meld index slot value for each cell. All meld index slot values are held in an array for later processing.
 (c) delta: for each cell, using stored results of previous calculations, the meld fraction is subtracted from (1.0+ sum fraction). The remainder is truncated of any integer portion and multiplied by the slot gamut to derive the delta index slot value. This index value is especially useful in distinguishing among match candidates that otherwise seem similar in their sum or meld indices. All delta index slot values are held in an array for later processing.

A given kind of SILKey is constructed from the corresponding kind of numeric inclination index of the respective LAVA cells. Using a convenient number base the numeric inclination index of each cell is converted into its equivalent alphanumeric slot text string value:

If the vector count of the cell is zero, the SILKey slot position is filled with a predetermined substring of characters to denote a null registry value. In the examples below "++" is the null registry slot substring.

If the vector count of the cell is greater than zero, the inclination index is converted to a text representation of the numeric in the chosen number base. If the resulting slot string has fewer characters than its defined width, it is prefixed with the number of "0" characters needed to achieve the defined slot width. The examples below use the hexadecimal number system. Each slot is two characters wide. Each SILKey comprises 25 slots for a total string length of 50 characters.

All kinds of SILKey associated with a given glyph, along with related items such as a glyph identifier, filename, and associated data sets, may be gathered into a data structure, herein called a SLLKeyPak and stored in an organized database called a SILK catalog. From a SILK catalog of all glyphs in a collection, one is able to derive an alphanumerically sorted list of SILKeys of a given kind, called a SILKey sort, or simply key sort, in which each SILKey is paired with an identifier of its parent glyph.

Given a specific kind of alphanumeric key sort, SILKeys may be rapidly searched, compared, and evaluated, using conventional text string operations, by matching corresponding slot values. Further, a variable match gamut, ranging from 0×00 to one-half the slot gamut, may be set to control fuzzy logic comparisons. Slot values differing by an amount less than or equal to the current match gamut are evaluated as matching.

Figure 5:
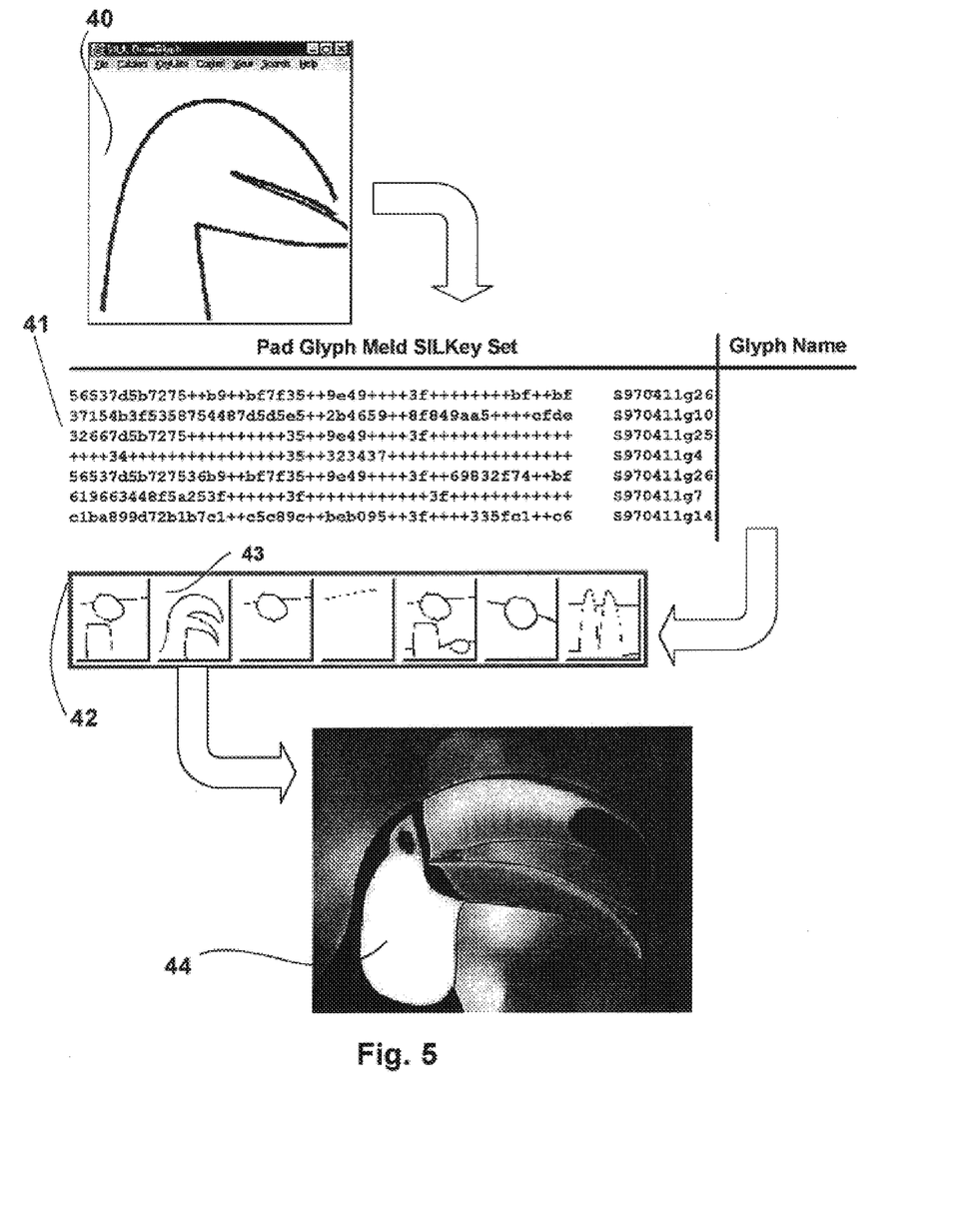
FIG. 5 shows a glyph manually drawn on a LAVA Pad where it is analyzed and used to sort, compare, match, and deploy candidate glyph-betokened interface control elements to conveniently retrieve and display associated data items.

FIG. 5 shows a graphic control interface that uses LAVA processing as a means of providing a custom array of control elements to conveniently search and retrieve items from an image database. In the example of FIG. 5 a collection of photographs stored in an image database has previously been traced (manually or by various feature extraction algorithms) to derive a token glyph that has been axially scaled to fit the square LAVA rendering area. The token glyph has been LAVA processed and its SILKey(s) consigned to a SILK catalog of token glyphs associated with all images in the database.

The LAVA Pad 40 is a combined drawing and analytic matrix within which motions of a control device such as a stylus or conventional computer mouse are controlled by a user to draw a reference glyph approximating the remembered (or anticipated) line configuration of a target item in the database. After the pad glyph is drawn the user selects some kind of SILKey sort (meld is illustrated 41 in FIG. 5) to be searched from a menu on the LAVA Pad. The LAVA Pad analyzes the drawn glyph displacement vector list to derive a reference SILKey with which to search the appropriate SILKey sort. The user may vary fuzzy logic parameters given in the match threshold and slot gamut values to control comparison of corresponding slots of candidate and reference SILKeys. These logic parameters establish the filtering permeability by which a SILKey set of candidate glyphs 41 is screened from the sort list. The user is able to try out settings that range from imperviously strict matching criteria to those so unrestricted as to cause a match for every glyph in the sort list. In this example the match gamut is set at 0×0a, meaning that a slot value may be anywhere in the range (KV−0×0a) . . . (KV+0×0a) and still be considered a match. The likeness threshold is set at 0×08, meaning that at least 0×08 slots must match to be included in the key set. The maximum size of the key set, here limited to 0×19 (25 decimal), may be set at any size convenient for displaying candidate tokens.

The LAVA Pad uses the SILKey set to present a match-ranked selection 42 of token candidates in an array of control elements (such as imaged buttons), each of which is associated with an object in the database. The user merely selects the control element 43 bearing an image most similar to the desired target 44 to retrieve it.

Figure 6:
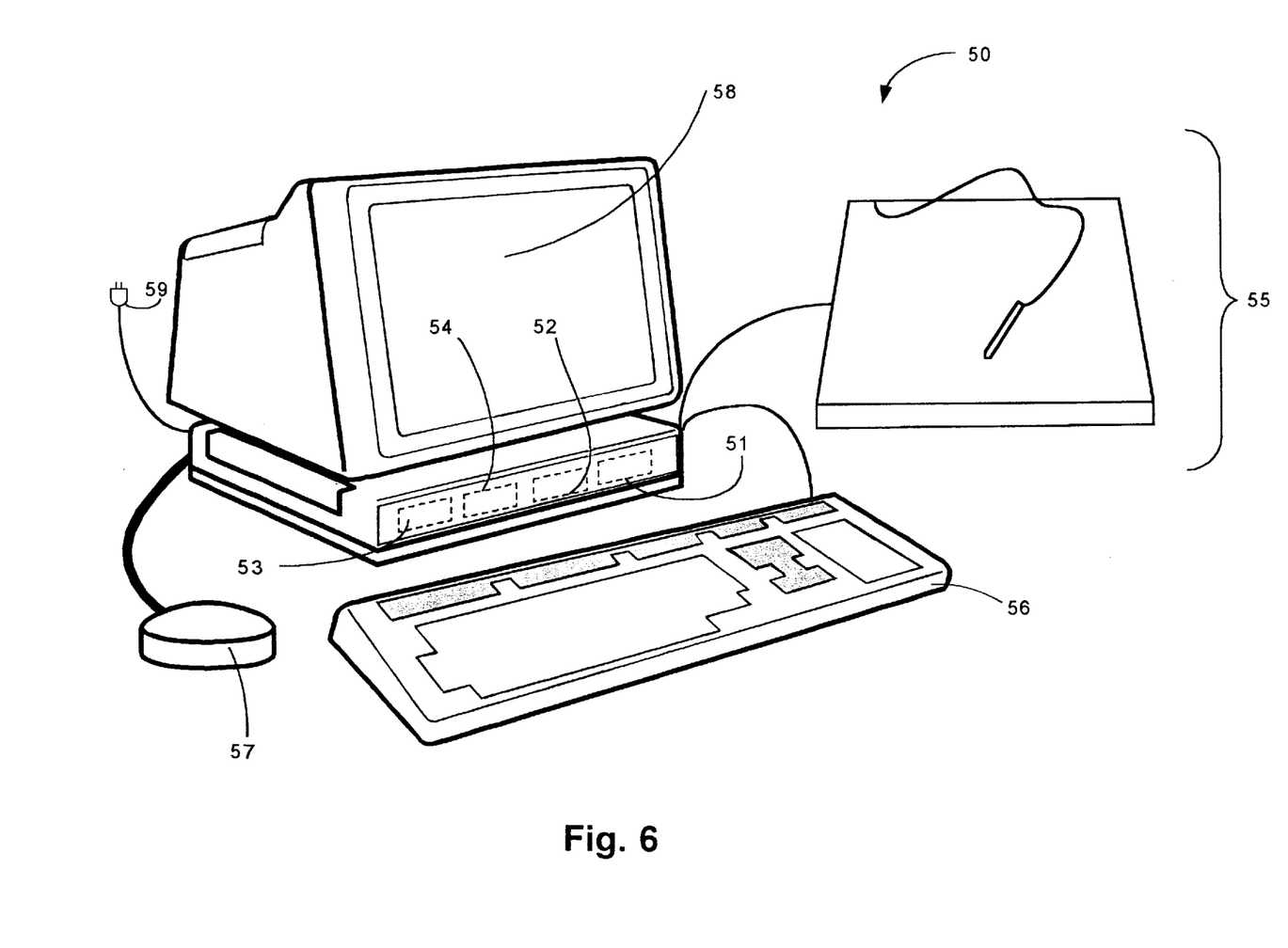
FIG. 6 is a generalized, schematic, simplified view of an exemplary computer system in which the methodology of the preferred, exemplary embodiment of the present invention is incorporated.

As can be seen in the general, simplified schematic of FIG. 6, the methodology of the invention is incorporated into and used in a computer based system 50, which minimally includes one or more computer central processing unit ["CPU(s)"] 51;
  programmable working memory 52 associated with said CPU(s), in the form of, for example, random access memory ("RAM") in one form or another;
  a data storage system 53, containing the image data base(s) thereon, associated with said CPU(s);
  persistent memory 54, for example, hard disk drives, optical disks, or other form(s) of persistent memory storage, including output devices, such as printers, tape drives, etc.;
  input/output ("I/O") means associated with at least said CPU(s), an example of which is a graphic input, such as a stylus and tablet 55, with other examples being a keyboard 56, mouse 57, voice control, etc., or combinations thereof, and
  a graphical display 58 in the form of a display monitor or panel;

all running off of a suitable source of, for example, AC electrical power 59. These associations can be intimate, that is, the elements combined into a single computer, workstation or mainframe, or the system can be distributed over, for example, a local area or wide area network (LAN or WAN) or the internet, in which multiple computers are involved, with each computer having a single CPU or multiple CPUs, with the latter using, for example, symmetrical multiple processors ("SMP").

With some little exception for the preferred embodiment, the details of the computer system are subject to great variation and future development, although the current state of hardware is sufficient in its capabilities to run the programmable methodology of the preferred embodiment of the invention. Indeed, the inventor has done successful test runs of the system on his portable computer.

It is noted that the embodiment(s) described herein in detail for exemplary purposes are of course subject to many different variations in structure, design, application and methodology. Because many varying and different embodiments may be made within the scope of the inventive concept(s) herein taught, and because many modifications may be made in the embodiment(s) herein detailed in accordance with the descriptive requirements of the law, it is to be understood that the details herein are to be interpreted as illustrative and not in a limiting sense.

DRAFT NOTES

Date of Draft: Nov. 4, 1997

Number of Words (Complete Document): 8,319

Number of Words in Body of Abstract (Max. 1501250): 376

LISTING OF REFERENCE NUMERALS IN DRAWINGS

30 LAVA lattice of cell partitions
31 Glyph motion path
32 Horizontal lattice boundary
33 Vertical lattice boundary
34 Gradient of vector transiting boundary of cells 10 and 11
35 Gradient of vector transiting boundary of cells 2 and 11
36 LAVA lattice area perimeter
37 Station point in cell 15
38 Station point in cell
39 Station point in cell 17
LP Leadpoint of vector
TP Trailpoint of vector
40 LAVA pad with drawn glyph key
41 Pad glyph meld SILKey set
42 Array of candidate control elements
43 User selected control element
44 Target retrieved from database Computer Based System (FIG. 6)

computer system 50 central processing unit ["CPU(s)"] 51 programmable working memory 52 data storage system 53 persistent memory 54 stylus and tablet 55 keyboard 56 mouse 57 a graphical display 58

AC electrical power 59

What is claimed is:

1. In connection with a computer based system for classifying, manipulating, storing, searching, and selectively retrieving items from at least one image database which includes multiple glyphs, which computer based system includes at least one computer processing unit,
programmable working memory associated with said at least one computer Processing unit,
a data storage system, containing the at least one image database, associated with said at least one computer processing unit,
persistent memory, and
input/output ("I/O") means associated with at least said at least one computer processing unit, a method of classifying, manipulating, storing, searching, and selectively retrieving items from said at least one image database, comprising the following steps:

a) setting up in working memory a template analytic lattice constituted of a predetermined multiplicity of cell partitions, the totality of the analytic lattice being coextensive with the defined rendering area of each of the glyphs and in the plane of motion of the linear motion paths of each of the glyphs;

b) interpreting in the working memory of the computer each linear motion path of each glyph as a sequence of displacement vectors, determining which displacement vectors intersect specific boundaries of specific cells of the analytic lattice, and registering in memory each cell boundary intersection by both recording the intersecting vector inclination gradient and incrementing an associated vector count for each cell bounded by the intersected boundary;

c) combining all of the vector inclination gradients registered for each cell in working memory, producing an associated numeric clutch value as a cumulative total of the registered vector inclination gradients;

d) deriving in working memory a numeric inclination index value for each cell from the associated vector count and the associated clutch value, the kind of the inclination index being selected from the group consisting of (1) a numeric sum inclination index calculated as the specific rotational increment of a resultant vector inclination derived by adding the inclinations of all the vector displacements that intersect the cell boundaries;

(2) a numeric meld inclination index calculated as the specific rotational increment of an average vector inclination derived by dividing the cell clutch value by the associated vector count; and (3) a numeric delta inclination index calculated as the specific rotational increment of differential vector inclination derived by subtracting the meld inclination index value from the sum inclination index value;

whereby there is no need to process representational content elements and incidental local mark features of the images in said at least one database, and whereby said at least one image database may be searched by filtering and eliminating non-viable search candidates prior to processor intensive content feature analysis through comparison of textual token keys.

2. The method of claim 1, wherein there is further included the step of:

using said at least one computer processing unit and working memory to derive for each said glyph for at least one of said kinds of inclination index-an associated textual token key comprising:

a multiplicity of text slot values corresponding to said multiplicity of said cells, including
means of representing each said cell inclination index value in each said slot as a text substring comprising a predetermined number of characters that expresses said inclination index in terms of a base number system when it has a value and denotes the absence of said inclination index value by some predetermined combination of characters; and
means of concatenating said slots in an order corresponding to a predetermined ordering of said analytic lattice cell partitions;

whereby results of a multiplicity of instances of said glyph analysis may be compared using conventional alphanumeric text string operations to derive and express useful match data regarding similarities of configured linear motion path dispositions among various subsets of said multiplicity of glyphs.

3. The method of claim 2, wherein, for a multiplicity of said glyphs contained in a collection of glyphs, each member of which is associated with at least one member of said at least one image database, and for a given kind of said textual token key, there is included the further steps of:

using said at least one computer processing unit and working memory to organize and search said at least one image database, including the sub-steps of referencing, accessing, and retrieving said glyph by said associated textual token key;
referencing, accessing, and retrieving said associated member of said at least one image database by accessing said textual token key of said associated glyph, further including A. compiling said textual token keys with said glyph referencing means into an alphanumerically sorted list to facilitate inserting and removing said textual token keys as glyphs are added to and removed from said collection of glyphs and further to enable rapid re-sorting, comparing, manipulating, and matching of said textual token keys as means to identifying and selecting subsets of similarly configured glyphs within said collection of glyphs; and B. comparing corresponding slots of said textual token keys within a predetermined tolerance gamut to find and enumerate matching sets of said corresponding slots for the purpose of determining whether said enumeration of said matched slots satisfies a predetermined threshold stating the number of matching slots required;

whereby items held in said at least one image database may be screened for search and retrieval by comparing and manipulating said corresponding slots of associated glyph textual token keys.

4. The method of claim 3, wherein there is included the steps of using said at least one computer processing unit and working memory, combined with an image display and a graphic input enabling a user to visually select among groups of displayed items, to custom configure elements of a control interface, further comprising the sub-steps of:

variably setting said tolerance gamut, and said match threshold;
analyzing said configured disposition of linear motion paths of said glyph drawn with said input means to thereby derive said associated textual token key to serve as a reference search key;

comparing within said predetermined tolerance gamut said input reference search key with each of said multiplicity of pre-existing said textual token keys that each reference at least one said associated member of said at least one image database;

selecting on the basis of said comparison with input reference search key, ranking in match order, and displaying candidate items from said multiplicity of glyphs along with said associated members of said at least one image database;

organizing said ranked candidate items as an array of control elements in which a specific control function is associated with each said displayed item; and activating said control function by said user executing some predetermined motion-with said graphic input;

whereby control elements of a user interface may be conveniently selected, deployed, and activated by said user approximating glyph linear configurations with drawn gestures that may be subsequently interpreted to a desired degree of accuracy.

5. The method of claim 4, wherein there is further included the step of:

using for said graphic input a stylus and touch sensitive tablet.

6. The method of claim 2, wherein there is included the steps of using said at least one computer processing unit and working memory, combined with a graphic input and other computer related elements to enable a user to guide multimedia operations and other computer system control events, further comprising the sub-steps of:

variably designating specific combinations of said textual token key slot positions;

associating specific computer system control events with specific values of said designated textual token key slot positions so that said specific values may cause said computer system to prepare and enable said associated specific computer system control events;

interpreting said glyph motion paths drawn by said user on said graphic input to produce said textual token keys that may be decoded into specific values that enable associated specific computer system control events; and setting an actuator to control the pace at which said enabled associated specific computer system control events are automatically actuated at intervals signaled by said actuator;

whereby said user may variably select combinations of multimedia delivery vehicles, control their pace of delivery, and generally interact with said computer system control events by drawing various linear motion path configurations on said graphic input.

7. The method of claim 6, wherein there is further included the step of:

using for said graphic input a stylus and touch sensitive tablet.

8. A computer based system for classifying, manipulating, storing, searching, and selectively retrieving items from at least one image database which includes multiple glyphs, which computer based system includes at least one computer processing unit, programmable working memory associated with said at least one computer processing unit, a data storage system, containing the image data base (s), associated with said at least one computer processing unit, persistent memory, and input/output ("I/O") means associated with at least said at least one computer processing unit, said persistent memory being programmed to provide in said computer system a method of classifying, manipulating, storing, searching, and selectively retrieving items from said at least one image database, comprising the following steps:

a) setting up in working memory a template analytic lattice constituted of a predetermined multiplicity of cell partitions, the totality of the analytic lattice being coextensive with the defined rendering area of each of the glyphs and in the plane of motion of the linear motion paths of each of the glyphs;

b) interpreting in the working memory of the computer each linear motion path of each glyph as a sequence of displacement vectors, determining which displacement vectors intersect specific boundaries of specific cells of the analytic lattice, and registering in memory each cell boundary intersection by both recording the intersecting vector inclination gradient and incrementing an associated vector count for each cell bounded by the intersected boundary;

c) combining all of the vector inclination gradients registered for each the cell in working memory, producing an associated numeric clutch value as a cumulative total of the registered vector inclination gradients;

d) deriving in working memory a numeric inclination index value for each cell from the associated vector count and the associated clutch value, the kind of the inclination index being selected from the group consisting of (1) a numeric sum inclination index calculated as the specific rotational increment of a resultant vector inclination derived by adding the inclinations of all the vector displacements that intersect the cell boundaries;

(2) a numeric meld inclination index calculated as the specific rotational increment of an average vector inclination derived by dividing the cell clutch value by the associated vector count; and (3) a numeric delta inclination index calculated as the specific rotational increment of a differential vector inclination derived by subtracting the meld inclination index value from the sum inclination index value;

whereby there is no need to process representational content elements and incidental local mark features of the images in said at least one database, and whereby said at least one image database may be searched by filtering and eliminating non-viable search candidates prior to processor intensive content feature analysis through comparison of textual token keys.

9. The computer system of claim 8, wherein said persistent memory is programmed to further include the step of:

using said at least one computer processing unit and working memory to derive for each said glyph for at least one of said kinds of inclination index an associated textual token key comprising:

a multiplicity of text slot values corresponding to said multiplicity of said cells, including means of representing each said cell inclination index value in each said slot as a text substring comprising a predetermined number of characters that expresses said inclination index in terms of a base number system when it has a value and denotes the absence of said inclination index value by some predetermined combination of characters; and means of concatenating said slots in an order corresponding to a predetermined ordering of said analytic lattice cell partitions;

whereby results of a multiplicity of instances of said glyph analysis may be compared using conventional alphanumeric text string operations to derive and express useful match data regarding similarities of configured linear motion path dispositions among various subsets of said multiplicity of glyphs.

10. The computer system of claim 9, wherein said persistent memory is programmed, for a multiplicity of said glyphs contained in a collection of glyphs, each member of which is associated with at least one member of said at least one image database, and for a given kind of said textual token key, to further include the steps of:

using said at least one computer processing unit and working memory to organize and search said at least one image database, to provide the further sub-steps of referencing, accessing, and retrieving said glyph by said associated textual token key;

referencing, accessing, and retrieving said associated member of said at least one image database by accessing said textual token key of said associated glyph, further including C. compiling said textual token keys with said glyph referencing means into an alphanumerically sorted list to facilitate inserting and removing said textual token keys as glyphs are added to and removed from said collection of glyphs and further to enable rapid re-sorting, comparing, manipulating, and matching of said textual token keys as means of identifying and selecting subsets of similarly configured glyphs within said collection of glyphs; and D. comparing corresponding slots of said textual token keys within a predetermined tolerance gamut to find and enumerate matching sets of said corresponding slots for the purpose of determining whether said enumeration of said matched slots satisfies a predetermined threshold stating the number of matching slots required;

whereby items held in said at least one image database may be screened for search and retrieval by comparing and manipulating said corresponding slots of associated glyph textual token keys.

11. The computer system of claim 10, wherein said persistent memory is programmed to further include the steps of using said at least one computer processing unit and working memory, combined with an image display and a graphic input enabling a user to visually select among groups of displayed items, to custom configure elements of a control interface, to further provide the sub-steps of:

variably setting said tolerance gamut and said match threshold;

analyzing said configured disposition of linear motion paths of said glyph drawn with said input means to thereby derive said associated textual token key to serve as a reference search key;

comparing within said predetermined tolerance gamut said input reference search key with each of said multiplicity of pre-existing said textual token keys that each reference at least one said associated member of said at least one image database;

selecting on the basis of said comparison with input reference search key, ranking in match order, and displaying candidate items from said multiplicity of glyphs along with said associated members of said at least one image database;

organizing said ranked candidate items as an array of control elements in which a specific control function is associated with each said displayed item; and activating said control function by said user executing some predetermined motion with said graphic input;

whereby control elements of a user interface may be conveniently selected, deployed, and activated by said user approximating glyph linear configurations with drawn gestures that may be subsequently interpreted to a desired degree of accuracy.

12. The computer system of claim 11, wherein said persistent memory is programmed to further include the step of:

using for said graphic input a stylus and touch sensitive tablet.

13. The computer system of claim 9, wherein said persistent memory is programmed to further include the steps of using said at least one computer processing unit and working memory, combined with a graphic input and other computer related elements to enable a user to guide multimedia operations and other computer system control events, to further provide the sub-steps of:

variably designating specific combinations of said textual token key slot positions;

associating specific computer system control events with specific values of said designated textual token key slot positions so that said specific values may cause said computer system to prepare and enable said associated specific computer system control events;

interpreting said glyph motion paths drawn by said user on said graphic input to produce said textual token keys that may be decoded into specific values that enable associated specific computer system control events; and setting an actuator to control the pace at which said enabled associated specific computer system control events are automatically actuated at intervals signaled by said actuator;

whereby said user may variably select combinations of multimedia delivery vehicles, control their pace of delivery, and generally interact with said computer system control events by drawing various linear motion path configurations on said graphic input.

14. The computer system of claim 13, wherein said persistent memory is programmed to further included the step of:

using for said graphic input a stylus and touch sensitive tablet.

* * * * *